Sept. 1, 1964      S. G. ENDERS      3,146,856

LUBRICATOR FOR JIG SAW

Filed Aug. 20, 1962      2 Sheets-Sheet 1

SHERWOOD G. ENDERS
*INVENTOR.*

BY *Leonard Bloom*

ATTORNEY

Sept. 1, 1964  S. G. ENDERS  3,146,856
LUBRICATOR FOR JIG SAW
Filed Aug. 20, 1962  2 Sheets-Sheet 2
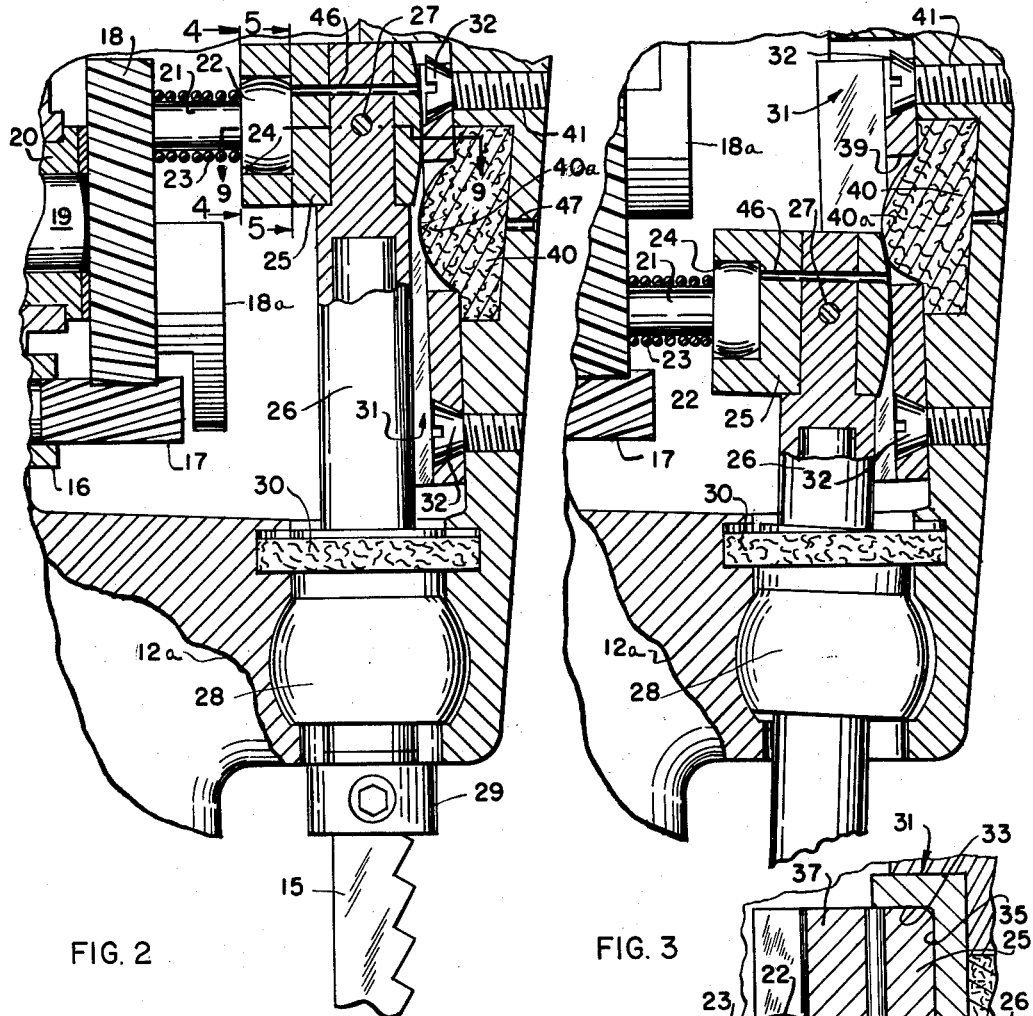
FIG. 2  FIG. 3
FIG. 9
FIG. 10
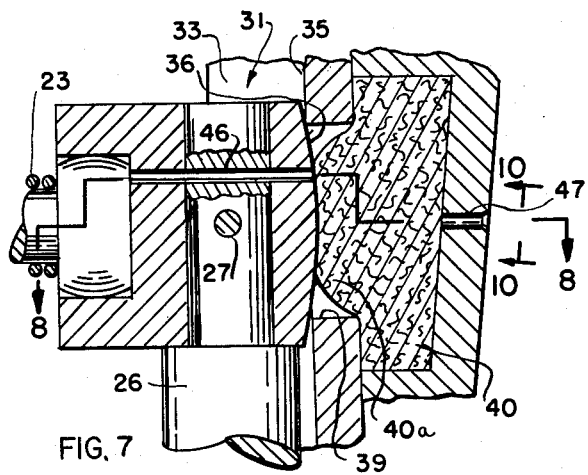
FIG. 7
SHERWOOD G. ENDERS
INVENTOR.
BY Leonard Bloom
ATTORNEY

United States Patent Office 3,146,856
Patented Sept. 1, 1964

3,146,856
LUBRICATOR FOR JIG SAW
Sherwood G. Enders, Bowleys Quarters, Md., assignor to The Black and Decker Manufacturing Company, Towson, Md., a corporation of Maryland
Filed Aug. 20, 1962, Ser. No. 217,844
8 Claims. (Cl. 184—102)

The present invention relates to a lubricator for a jig saw, and more particularly, to an inexpensive, efficient and reliable lubricator for a portable electric jig saw, and preferably, for such a jig saw that develops an arcuate blade motion.

It is an object of the present invention to provide a lubricator, which is relatively inexpensive, which will enhance the performance and reliability of the jig saw within which it is used, and which has means included therein for periodically replenishing the supply of lubricant retained in an oil wick.

In accordance with a preferred embodiment made in accordance with the teachings of the present invention, there is provided a housing having a rotating member, such as a gear, journaled in the housing. A shaft is journaled in the housing for reciprocation along an axis which is substantially transverse to the axis of the rotating gear. A member is secured to the shaft, preferably near the innermost or top portion thereof. This member includes a forward portion, a rearward portion, and respective side surfaces. A transverse yoke is formed in the rearward portion of the member; and eccentric means, which are carried by the rotating gear, are guided within the yoke; consequently, the rotation of the gear is translated into the reciprocation of the shaft. A guide channel is secured to the housing forwardly of the member. The guide channel has a pair of side walls and further has a trough intermediate the side walls. The member, which is secured to the shaft, is guided within the channel, such that the side surfaces of the member bear against the respective side walls of the channel, and such that the forward portion of the member bears against the trough of the channel. An opening is formed in the trough of the guide channel; and an oil wick (or suitable lubricant applicator), which is retained in the housing, has at least one portion thereof protruding through the opening in the trough of the channel. Hence, the oil wick may engage the forward portion of the member so as to deposit a lubricant thereon. Preferably, the member, as well as a portion of the reciprocating shaft, is provided with at least one passageway or duct passing from the forward portion thereof rearwardly into the transverse yoke; and thus the lubricant, which is picked up by the member, may flow into the transverse yoke and lubricate the eccentric means guided within the yoke. Moreover, and preferably, a second oil duct may be formed in the housing, so that the supply of lubricant in the oil wick may be replenished periodically.

These and other objects of the present invention will become apparent from a reading of the following specification, taken in conjunction with the enclosed drawings, in which:

FIGURE 2 is an enlarged view of the motion-translating mechanism and lubricator illustrated in FIGURE 1;

FIGURE 3 is a view corresponding substantially to that of FIGURE 2, but with the reciprocating shaft in its lowermost position;

FIGURE 7 is an enlarged sectional view corresponding substantially to a portion of FIGURES 2 or 3, but showing the member which is secured to the reciprocating shaft in the position of wiping against or contacting the oil wick;

FIGURE 9 is a sectional view taken along the lines 9—9 of FIGURE 2, showing the means for securing the member to the reciprocating shaft, and further showing the guide channel for the member; and FIGURE 10 is an elevational view taken along the lines 10—10 of FIGURE 7, showing part of the means for replenishing the supply of lubricant in the oil wick.

Figure 1:
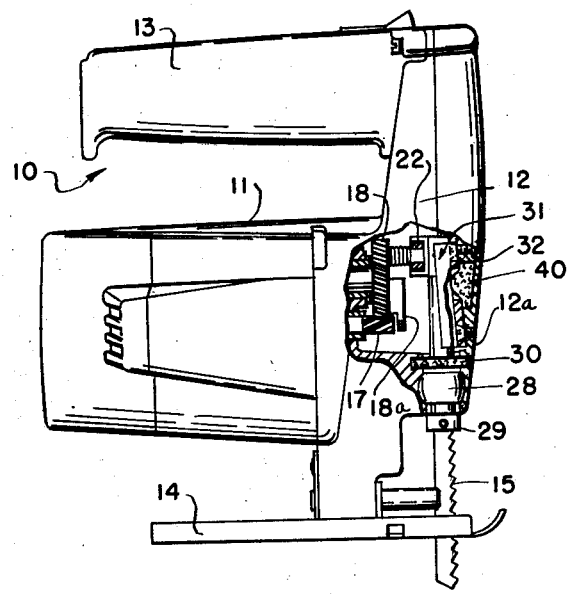
FIGURE 1 is a side elevational view of the complete jig saw, with parts broken away and sectioned, illustrating the motion-translating mechanism as well as the lubricator.
Figure 4:
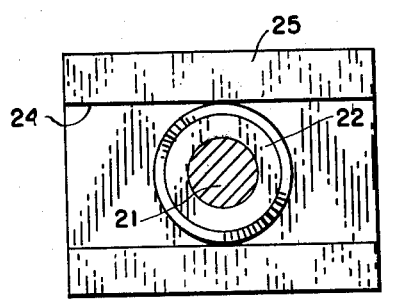
FIGURE 4 is a slightly enlarged sectional view taken along the lines 4—4 of FIGURE 2.
Figure 5:
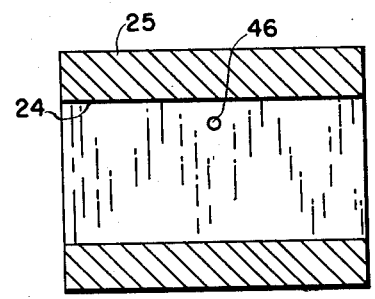
FIGURE 5 is a slightly enlarged sectional view taken along the lines 5—5 of FIGURE 2.
Figure 6:
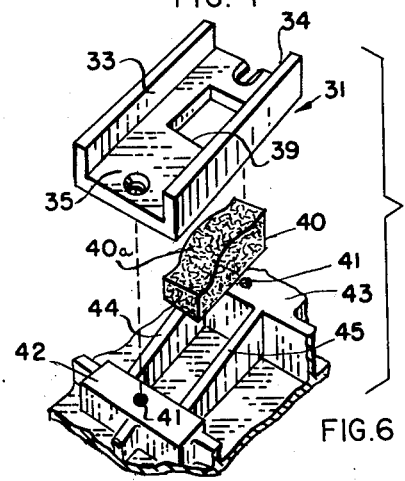
FIGURE 6 is an exploded perspective view showing the means for retaining and utilizing the oil wick.

With reference to FIGURE 1, there is illustrated a portable electric jig saw 10 which comprises a motor housing 11, a gear case 12 which includes a housing portion 12a, an overhead handle 13, a shoe 14 adapted to rest upon the work surface, and a reciprocating blade 15.

With reference again to FIGURE 1, and with further reference to FIGURES 2, 3, 4, and 5, the jig saw 10 includes an armature shaft 16 having a pinion 17 formed thereon for meshing engagement with a gear 18 having a counterbalance 18a. Gear 18 is carried by a stub shaft 19, which is journaled within a bushing 20. An eccentric pin 21 is carried by the gear 18, and a spherical roller 22 is loosely mounted upon the end of the pin 21. Resilient means, such as a coil spring 23, is carried by the eccentric pin 21 intermediate the roller 22 and the face of the gear 18, and the purpose of the spring 23 will hereinafter become apparent. The roller 22 is guided within a transverse yoke 24, which is formed in the rearward portion of a member 25. Member 25, as shown in FIGURE 9, is secured to a reciprocating shaft 26 by means of a pin 27. The shaft 26, which is preferably tubular, is journaled in the housing 12a by means of a pivoted bearing 28. Bearing 28 is adapted to pivot about an axis which is substantially transverse to the longitudinal axis of the reciprocating shaft 26. The outer or lower end of the reciprocating shaft 26 has a saw blade 14 secured thereto by a suitable clamp, which is designated generally as at 29. Also, a felt washer 30 may be retained in the housing 12a adjacent to the top of the pivoted bearing 28 so as to form a grease seal.

With reference again to FIGURES 2 and 3, and with further reference to FIGURES 6, 7, 8 and 9, a stationary guide channel 31 (or similar element) is secured to the housing 12a by means of screws 32. The guide channel 31 has a pair of respective side walls 33 and 34 and further has a trough 35 intermediate the side walls 33, 34. The member 25, which is secured to the shaft 26 by means of the pin 27, has a forward portion 36, which, being urged forwardly under the influence of the spring 23 as well as the pressure exerted by the operator upon the work being cut, is adapted to slide or bear against the trough 35 of the guide channel 31. Moreover, the member 25 has respective side surfaces 37 and 38, which bear against the respective side walls 33 and 34 of the channel 31. Preferably, the forward portion 36 of the member 25 has a cam or rounded face formed thereon, and the trough 35 of the guide channel 31 is angularly offset or skewed with respect to the longitudinal axis of the reciprocating shaft 26. Consequently, the shaft 26, as it is being reciprocated through the motion-translating mechanism which includes the yoke 24 and the eccentric pin 21, will be constrained to move in a slightly arcuate path, which is concave with respect to the face of the gear 18; this arcuate motion is accommodated in the housing 12a by means of the pivoted bearing 28, which, as shown more clearly in FIGURE 3, is allowed to pivot through a slight angle along an axis which is transverse to the longitudinal axis of the reciprocating shaft 26.

A slotted opening 39 is formed in the trough 35 of the guide channel 31; and an oil wick 40 or suitable lubricant applicator, which is retained in the housing 12a, has a portion 40a protruding through the slotted opening 39 so as to engage or wipe against the forward portion 36 of the member 25. As shown more clearly in FIGURE 6, the guide channel 31 is secured to the housing 12a by means of the screws 32, as aforesaid, and the screws 32 pass through the trough 35 to be received within corresponding threaded holes 41 formed in the respective mounting bosses 42 and 43 of the housing 12a. Moreover, as further shown in FIGURE 6, a pair of respective spaced-apart substantially-parallel ribs 44 and 45 pass between the mounting bosses 42 and 43.

Consequently, it will be appreciated that the oil wick 40 is loosely fitted between the mounting bosses 42 and 43, and the ribs 44 and 45, and thereafter is retained or trapped in place when the guide channel 31 is secured to the housing 12a.

Figure 8:
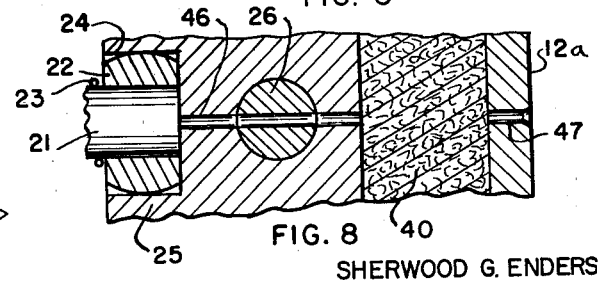
FIGURE 8 is a sectional view taken along the lines 8—8 of FIGURE 7, showing the duct for passing the lubricant into the yoke, and further showing the second duct for replenishing the supply of lubricant in the oil wick.

Moreover, and as shown in FIGURES 7 and 8, at least one passageway or duct 46 is formed in the member 25, as well as within shaft 26, between the forward portion 36 and the rearward portion within which the transverse yoke 24 is formed. Hence, the lubricant which is picked up by the forward portion 36 of the member 25 may be allowed to flow rearwardly within the member 25 so as to be deposited or collected within the transverse yoke 24, thereby providing lubrication not only for the yoke 24 but also for the roller 22 and the eccentric pin 21. If desired, the duct 46 may be suitably angled to facilitate the flow of lubricant rearwardly into the yoke 24. Furthermore, a second oil duct 47 may be formed in the housing 12a of the gear case 12 so that (as shown more clearly in FIGURES 7 and 10) the supply of lubricant retained in the oil wick 40 may be conveniently replenished from time-to-time by the user.

Obviously, many modifications may be made without departing from the basic spirit of the present invention; and accordingly, within the scope of the appended claims, the invention may be practiced other than has been specifically described.

I claim:

1. In a jig saw, the combination of:
   (a) a housing;
   (b) a rotating member in said housing;
   (c) a reciprocating shaft journaled in said housing;
   (d) a member secured to said shaft;
   (e) said member including a forward portion having a cam surface formed thereon, a rearward portion, and respective side surfaces;
   (f) a transverse yoke formed in said rearward portion of said member;
   (g) eccentric means carried by said rotating member and guided within said yoke, whereby said shaft is reciprocated;
   (h) a guide channel secured to said housing and having a pair of side walls and further having a trough intermediate said side walls, said trough being angularly skewed with respect to the longitudinal axis of said reciprocating shaft, said member being guided within said channel such that its side surfaces bear against said respective side walls of said channel and the cam surface of its forward portion bears against said trough of said channel, whereby said shaft is constrained by said channel to reciprocate in an arcuate path;
   (i) an opening formed in said trough of said guide channel; and
   (j) a lubricant applicator retained in said housing and having at least a portion thereof protruding through said opening in said trough of said channel, whereby said cam surface of said forward portion of said member periodically engages said applicator as said member is reciprocated.

2. The combination of claim 1, wherein:
   (a) said reciprocating shaft and said member secured thereto have a mutual duct formed therein, said duct opening forwardly at said cam surface of said forward portion of said member, running through said member and said shaft, and terminating rearwardly in said yoke formed in said member, thereby communicating said yoke in said member with said cam surface of said forward portion of said member, whereby the lubricant acquired by said forward portion of said member may pass through said member and said shaft and enter said yoke to lubricate said yoke and said eccentric means guided within said yoke.

3. In a jig saw, the combination of:
   (a) a housing;
   (b) a reciprocating shaft journaled in said housing;
   (c) means to reciprocate said shaft;
   (d) said means including a member secured to said shaft;
   (e) said member further having a forward portion;
   (f) an element secured to said housing and having a substantially-flat portion upon which said forward portion of said member bears;
   (g) resilient means constantly urging said member against said element;
   (h) an opening formed in said element;
   (i) a lubricant applicator retained between said housing and said element and having a portion thereof protruding through said opening in said element to engage said forward portion of said member; and
   (j) means including a duct formed in said housing between said applicator and the external surface of said housing to replenish the supply of lubricant in said applicator.

4. In a jig saw, comprising in combination:
   (a) a housing;
   (b) a reciprocating shaft journaled in said housing;
   (c) means to reciprocate said shaft;
   (d) said means comprising a member secured to said shaft, a transverse yoke formed in said member, and an eccentric guided within said yoke to reciprocate said member and shaft assembly;
   (e) said member further having a forward portion;
   (f) an element secured to said housing and having a substantially-flat portion upon which said forward portion of said member bears;
   (g) an opening formed in said element;
   (h) a lubricant applicator retained in said housing and having a portion thereof protruding through said opening in said element to engage said forward portion of said member as said member is reciprocated;
   (i) means to replenish the supply of lubricant in said applicator; and
   (j) means to duct the lubricant acquired by said forward portion of said member through said member and into said transverse yoke formed in said member, thereby lubricating said yoke and said eccentric guided within said yoke.

5. In a jig saw, the combination of:
   (a) a housing;
   (b) a member reciprocating in said housing and having a forward portion;
   (c) a guide channel for said member;
   (d) said guide channel being secured to said housing and having a trough, whereby said forward portion of said member bears against said trough;

(e) a pair of mounting bosses formed in said housing for said guide channel;
(f) a pair of spaced-apart substantially-parallel ribs formed transversely of said mounting bosses;
(g) a lubricant applicator received between said mounting bosses and said ribs;
(h) said applicator being trapped between said housing and said trough of said guide channel;
(i) a slotted opening formed in said trough of said guide channel; and
(j) said applicator having at least a portion thereof protruding through said slotted opening in said trough of said guide channel to engage said forward portion of said member.

6. In a jig saw, the combination of:
(a) a housing;
(b) a member reciprocating in said housing and having a forward portion;
(c) a transverse yoke formed in said member rearwardly of said forward portion of said member and an eccentric guided within said yoke;
(d) an element secured to said housing forwardly of said member and having a substantially-flat portion upon which said forward portion of said member bears as said member reciprocates in said housing;
(e) an opening formed in said element;
(f) a lubricant applicator retained in said housing and having a portion thereof protruding through said opening in said element to engage said forward portion of said member;
(g) means to replenish the supply of lubricant in said applicator; and
(h) a duct formed in said member transversely to the axis of reciprocation of said member, said duct opening to said forward portion of said member, running through said member, and terminating rearwardly in said yoke formed in said member, thereby communicating said yoke formed in said member with said forward portion of said member, whereby the lubricant acquired by said forward portion of said member may pass through said member and enter said yoke to lubricate said yoke and said eccentric guided within said yoke.

7. A lubricator for a jig saw, comprising in combination:
(a) a housing;
(b) a gear journaled for rotation in said housing;
(c) an eccentric pin carried by said gear;
(d) a roller mounted upon the end of said pin;
(e) a reciprocating shaft journaled in said housing along an axis substantially transverse to the axis of said gear;
(f) a member secured to said shaft and reciprocating along with said shaft;
(g) said member including a forward portion, a rearward portion, and respective side surfaces;
(h) a transverse yoke formed in said rearward portion of said member, and said roller being guided in said yoke, whereby the rotation of said gear is translated into the reciprocation of said shaft;
(i) a guide channel secured to said housing and having a pair of side walls and further having a trough intermediate said side walls, whereby said member is guided within said channel, with said side surfaces of said member bearing against said side walls of said chaannel, and with said forward portion of said member bearing against said trough of said channel;
(j) resilient means carried by said eccentric pin, intermediate said gear and said roller, and constantly urging said forward portion of said member into bearing engagement with said trough in said channel;
(k) an opening formed in said trough; and
(l) a lubricant applicator retained in said housing and having at least a portion thereof protruding through said opening in said trough of said channel to engage said forward portion of said member.

8. In a jig saw, the combination of:
(a) a housing;
(b) a shaft journaled in said housing for reciprocation along its longitudinal axis;
(c) a pivoted bearing for journaling said shaft, said bearing alternately pivoting about an axis which is transverse to the longitudinal axis of said shaft;
(d) means to constrain said shaft to reciprocate in a slightly arcuate path, said means comprising a first member carried by said shaft and a second member secured to said housing;
(e) said members being in constant bearing engagement with each other and one of said members forming a guide track for the other of said members, said guide track being angularly skewed with respect to the longitudinal axis of said shaft;
(f) a lubricant applicator retained between said housing and said second member and periodically engaging said first member during the reciprocation of said member; and
(g) means to replenish the supply of lubricant in said applicator.

References Cited in the file of this patent
UNITED STATES PATENTS

| | | |
|---|---|---|
| 2,024,329 | Beesley | Dec. 17, 1935 |
| 2,278,174 | Gray | Mar. 31, 1942 |
| 2,700,432 | Hieger | Jan. 25, 1955 |
| 2,869,231 | Gury | Jan. 20, 1959 |